United States Patent
Nakanishi (12)

(10) Patent No.: US 6,205,483 B1
(45) Date of Patent: *Mar. 20, 2001

(54) NETWORK INTERFACE THAT PREVENTS MAC OR IP ADDRESS SPOOFING OF A MANAGEMENT STATION BY MAKING A MANAGEMENT STATION ADDRESS REGISTER UNCHANGEABLE BY SOFTWARE

(75) Inventor: Takayuki Nakanishi, Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/004,596

(22) Filed: Jan. 8, 1998

(30) Foreign Application Priority Data

Jul. 25, 1997 (JP) ................................... 9-200442

(51) Int. Cl.⁷ ........................... G06F 15/16; G06F 15/173
(52) U.S. Cl. ............................. 709/229; 709/250
(58) Field of Search .................................. 709/223, 225, 709/229, 232, 244, 245, 250

(56) References Cited

U.S. PATENT DOCUMENTS

| | | | |
|---|---|---|---|
| 5,136,580 | * 8/1992 | Videlock et al. | 370/403 |
| 5,414,694 | * 5/1995 | Crayford et al. | 370/246 |
| 5,590,285 | * 12/1996 | Krause et al. | 709/218 |
| 5,615,340 | * 3/1997 | Dai et al. | 709/250 |
| 5,796,942 | * 8/1998 | Esbensen | 713/201 |
| 5,915,087 | * 6/1999 | Hammond et al. | 713/201 |
| 5,935,245 | * 8/1999 | Sherer | 713/200 |

FOREIGN PATENT DOCUMENTS

| | | |
|---|---|---|
| 2272841 | 11/1990 | (JP) . |
| 6103197 | 4/1994 | (JP) . |

OTHER PUBLICATIONS

Atkins et al., "Internet Security: Professional Reference," 2nd ed., New Riders Publishing, pp. 196–232, 1997.*

* cited by examiner

*Primary Examiner*—Zarni Maung
*Assistant Examiner*—Andrew Caldwell
(74) *Attorney, Agent, or Firm*—Helfgott & Karas, P.C.

(57) ABSTRACT

In a local area network where communication between terminals is regulated by designating a management, or target, terminal, which is responsible for updating connecting regulation information on the other terminals, each communication terminal includes a station and a network interface. The network interface stores connecting regulation information in RAM. The network interface forwards or discards packets based on the connecting regulation information and the packet source and destination addresses. The network interface includes hardware, software, and a communication protocol designed to reduce the possibility of spoofing, where a terminal other than the target terminal changes the connecting regulation information. Each network interface includes a dip switch that is set to the target terminal's layer 2 MAC address or its layer 3 IP, or network, address. The network interface will only transmit a packet setting connecting regulation information if its own address is the same as the value in the dip switch. The network interface will only update its connecting regulation information if the packet source address equals the dip switch value. The system therefore reduces the chance of a terminal successfully pretending to be the target terminal.

12 Claims, 10 Drawing Sheets

NETWORK INTERFACE THAT PREVENTS MAC OR IP ADDRESS SPOOFING OF A MANAGEMENT STATION BY MAKING A MANAGEMENT STATION ADDRESS REGISTER UNCHANGEABLE BY SOFTWARE

BACKGROUND OF THE INVENTION

1. Field of the Invention

The present invention relates to a communication apparatus, a communication terminal and a program recording medium, which are used for constituting a local area network.

2. Description of the Related Art

Over the recent years, the information has been exchanged by use of a local area network (hereinafter referred to as a LAN) in a variety of fields. A construction and a fundamental operation of the LAN used at the present will be described by exemplifying a bus type LAN with reference to FIG. 10.

As illustrated in FIG. 10, the LAN is constructed of a transmission line, a plurality of stations 31 and a plurality of nodes 34 (known as network interface cards). The stations 31 are defined as apparatuses (e.g., computers) actually employed by users who exchange the information by using the LAN. The node 34 is defined as a communication apparatus for connecting the station 31 to the transmission line, and is constructed of a controller 32 and a transceiver 33. It is to be noted that a specific construction (configuration) of the node 34 is different depending on the specifications of the LAN and the construction of the station 31. For example, in the LAN based on the specifications classified as 10BASE2, if the station 31 is a disk top type computer, a board type apparatus insertable into an extension slot of the computer is used as a node 34. By contrast, in the LAN based on the specifications classified as 10BASE5, the board inserted into the extension slot is an apparatus corresponding to the controller 32, and the transceiver 33 is connected to this board (the controller 32) via a cable.

The node 34 executes a process of converting data outputted by the station 31 into a signal for the transmission line, and a process reverse thereto. More specifically, the controller 32 within the node 34, when indicated by the station 31 to transmit the data, creates a packet by adding, to this item of data, pieces of information such as a transmitting address and a receiving address (which are layer-2 addresses called a LAN address or a MAC address), and transfers the thus created packet to the transceiver 33. The transceiver 33 converts a form of the signal of the transferred packet and transmits it onto the transmission line.

When the packet is transmitted via the transmission line, the transceiver 33 receives this packet, converts the signal form and transfers it to the controller 32. The controller 32, if the receiving address within the transferred packet is coincident with an address allocated to the controller 32 itself (hereinafter referred to as a self-address), transfers the intra-packet data to the station 31. Note that the self address is normally printed inwardly of the controller 21 by the manufacturer. Whereas if the intra-packet receiving address is not coincident with the self-address, the controller 32 disposes of the transferred packet without transferring the intra-packet data to the station 31.

For instance, when the data transmitted from a station C to a station A, as shown in FIG. 10, a packet in which "A" is set in the receiving address and "C" is set in the transmitting address, is sent to the transmission line from a node C. Both of the node A and the node B receive this packet, however, the node B discards the received packet because of the receiving address not being the self-address. While on the other hand, the node A transfers the data contained in that packet to the station A because of the receiving address being the self-address. In the LAN, the data transmitted from the station C to the station A thus arrives at only the station A.

In the normal LAN, a protocols explained so far is used in combination with a high-layer protocol (TCP/IP etc.) incorporating a communication processing function to some extent. In the high-layer protocol, an address (a layer-3 address called a network address etc) different from the LAN address is used. Therefore, the packet transmitted onto the transmission line is in fact the one holding the data containing the address used in the high-layer protocol, and any one of the controller 32 and the station 31 implements control (a process relative to the high-layer protocol) making use of the network address.

As explained above, the prior art LAN is designed for freely exchanging the information between the stations. Hence, it was difficult to perform a test etc by use of the conventional LAN. Further, when an important conference using the LAN takes place, it might happen that data not related to the conference are received by the stations engaged in the conference, which can hinder the conference may occur.

SUMMARY OF THE INVENTION

It is a primary object of the present invention to provide a communication apparatus, a communication terminal and a program recording medium that are capable of constituting a local area network which would be able to restrict information exchanged between stations.

To accomplish the above and other objects, according to a first aspect of the present invention, a communication apparatus is connected to a terminal and a transmission line of a local area network, and allows the terminal to function as one communication terminal of the local area network. The communication apparatus includes a communication regulation information storing unit which stores communication regulation information defined as information for classifying other communication terminals connected to the local area network into a communication terminal permitted to communicate and a terminal not permitted to communicate in accordance with a network address. A take-in unit of the apparatus takes in communication data addressed to a self-terminal from the transmission line on the basis of a receiving LAN address contained in the communication data propagating through the transmission line. The communication apparatus has a judging unit for judging, based on a transmitting network address contained in the communication data taken in by the take-in unit and the communication regulation information within the communication regulation information storing unit, whether or not a communication data transmitting unit is a communication terminal permitted to communicate. A supplying unit of the apparatus of the present invention supplies the terminal with only a content of the communication data transmitted by the terminal judged as the communication terminal permitted to communicates That is, the communication apparatus according to the first aspect of the present invention corresponds to an apparatus known as a network interface card, and is combined with a terminal to constitute a communication terminal. The communication apparatus according to the first aspect, when it takes in the communication data (packet) addressed to the communication apparatus itself, to start with, determines whether or not the communication data is communication data from the communication terminal permitted to communicate on the basis of a transmitting network address contained in the communication data and internally stored communication regulation information for classifying terminals into a communication terminal permitted to communicate and a communication terminal not permitted to communicate in accordance with the network address. Then, only when the communication data is the one from the communication terminal permitted to communicate, the terminal to which the communication apparatus is connected is supplied with the same communication data.

Therefore, in the LAN constructed using present communication apparatuses, the communication data supplied to each terminal can be restricted by setting the communication regulation information having a proper content to each communication apparatus. Accordingly, a test and a conference etc can take place under such a condition that communication data given from others excluding the persons concerned are not received by the terminals (a content of the communication data is not displayed in the terminal).

According to a second aspect of the present invention, a communication apparatus is connected to a terminal and a transmission line of a local area network, and allows the terminal to function as one communication terminal of the local area network. This communication apparatus includes a communication regulation information storing unit which stores communication regulation information defined as information for classifying other communication terminals connected to the local area network into a communication terminal permitted to communicate and a terminal not permitted to communicate in accordance with a network address. A transmitting destination judging unit is provided in the communication apparatus, which, when it is indicated to transmit data from the terminal, judges whether or not a data transmitting destination is the communication terminal permitted to communicate, on the basis of the network address of the communication terminal to which the relevant data is transmitted and the communication regulation information within the communication regulation information storing unit. The communication apparatus also has a sending unit which sends onto the transmission line, communication data corresponding to the data indicated to be transmitted only when the transmitting destination judging unit judges that the data transmitted terminal is the communication terminal permitted to communicate.

Thus, the communication apparatus according to the second aspect, when it is indicated to transmit the data by the terminal connected to the communication apparatus itself, judges whether or not the data transmitted terminal is the communication terminal permitted to communicate on the basis of the network address of the transmitting destination communication terminal of the above data and the internally stored communication regulation information. Then, only when indicated to transmit the data to the communication terminal permitted to communicate, the communication data corresponding to this item of data is sent onto the transmission line.

Namely, the communication apparatus according to the second aspect, in sharp contrast with the communication apparatus according to the first aspect, restricts the communication data sent onto the transmission line on the basis of the communication regulation information. The test and the conference etc can be also carried out under the condition in which the communication data from others excluding the persons concerned are not received by the terminals through the LAN constructed by use of these communication apparatuses. It should be noted that in the LAN constructed by use of the above communication apparatuses, it never happens that the communication data to be disposed of in the destination communication apparatus is sent onto the transmission line. Therefore, the LAN which uses the present communication apparatuses has a less possibility of being kept waiting for the transmission of the communication data and of requiring retransmission of the communication data than in the LAN constructed using the communication apparatuses according to the first aspect.

It is to be noted that in the communication apparatus according to the first aspect, a transmitting destination judging unit may be provided, which, when it is indicated to transmit data from the terminal, judges whether or not a data transmitting destination is the communication terminal permitted to communicate, on the basis of the network address of the communication terminal to which the relevant data is transmitted and the communication regulation information within the communication regulation information storing unit. A sending unit of the apparatus sends onto the transmission line, communication data corresponding to the data indicated to be transmitted only when the transmitting destination judging unit judges that the data transmitted terminal is the communication terminal permitted to communicate. Thus, a communication apparatus may incorporate functions of both communication apparatuses, namely according to the first aspect and according to the second aspect of the invention.

Further, when constructing the communication apparatus according to the first or second aspect, the communication data may include a field in which to set a connecting regulation information identifier showing whether or not the communication data is communication data holding the connecting regulation information, and the communication apparatus may further comprise a communication regulation information setting unit for, when the take-in unit takes in the communication data having a connecting regulation information identifier showing that the data is the communication data holding the connecting regulation information, setting data contained in the communication data as communication regulation information in the storing unit which stores communication regulation information.

The LAN capable of setting the communication regulation information through the communications can be constructed as a communication apparatus.

Moreover, in the case of the communication apparatus for transmitting and receiving the communication data having the field in which the connecting regulation information identifier is set, it is desirable to use the communication regulation information setting unit which, when the communication data taken in by the take-in means has a connecting regulation information identifier showing that the data is the data holding the connecting regulation information and has the same transmitting network address as a preset network address, sets data contained in the communication data as communication regulation information in the communication regulation information storing unit.

In the above case, there may be further provided a dip switch for setting the network address and may be used the communication regulation information setting unit which, when the communication data taken in by the take-in unit has a connecting regulation information identifier showing that the data is the data holding the connecting regulation information and has the same transmitting network address as a network address set in the dip switch, sets data contained in the communication data as communication regulation information in the communication regulation information storing unit.

Thus, the LAN which can make it difficult to illegally set the communication regulation information, can be constructed as a communication apparatus for setting the communication regulation information after confirming a validity of a value of the transmitting network address.

Moreover, the communication apparatus may be constructed to include a setting completion notifying unit for transmitting, when the communication regulation information setting unit sets the communication regulation information, communication data indicating that setting of the communication regulation information is completed, to the communication terminal having sent the communication data holding the connecting regulation information. If the LAN is constructed by using the thus constructed communication apparatuses, the communication terminal having transmitted the communication data holding the connecting regulation information, is capable of recognizing whether or not the communication regulation based on the communication data is actually completed.

It should be noted that the communication apparatus may be constructed to implement the above-described connecting regulation in accordance with not the network address but a LAN address (a MAC address). When employing the thus constructed communication apparatus, there is restricted a content of the connecting regulation which can be imposed between the terminals connected via a router, and therefore the communication apparatus that regulate the communications through the network address should be used when trying to implement an arbitrary connecting regulation also between the terminals connected via the router.

Further, the terminal may execute a part of functions of the communication apparatus according to the present invention. That is, the communication terminal comprising the communication apparatus and the terminal may also be constructed to perform the operation described above on the whole. Moreover, as a matter of course, the thus constructed communication terminal may also be realized by making the computer incorporating the communication function operate based on a predetermined program stored on a program recording medium.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Illustrative embodiments of the present invention will hereinafter be specifically described with reference to the accompanying drawings.

First Embodiment

Figure 1:
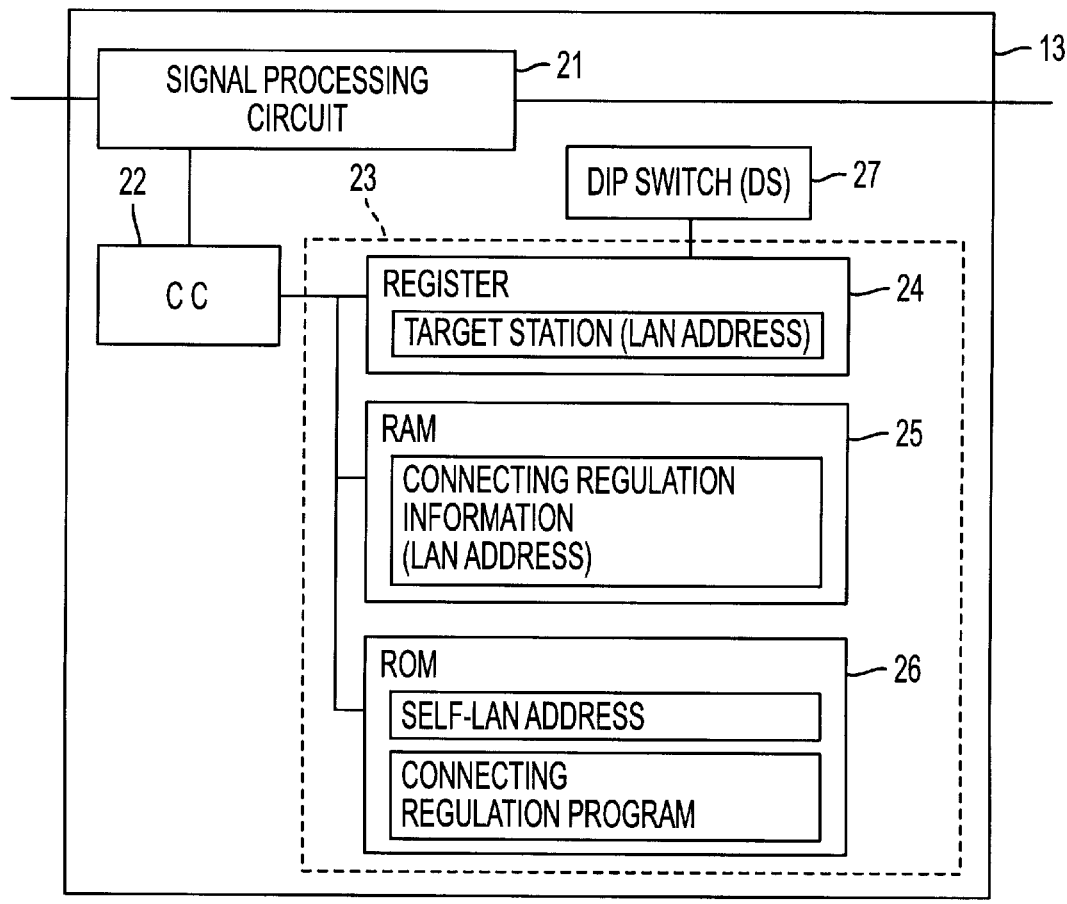
FIG. 1 is an explanatory diagram showing a LAN constructed by use of nodes in a first embodiment.
Figure 2:
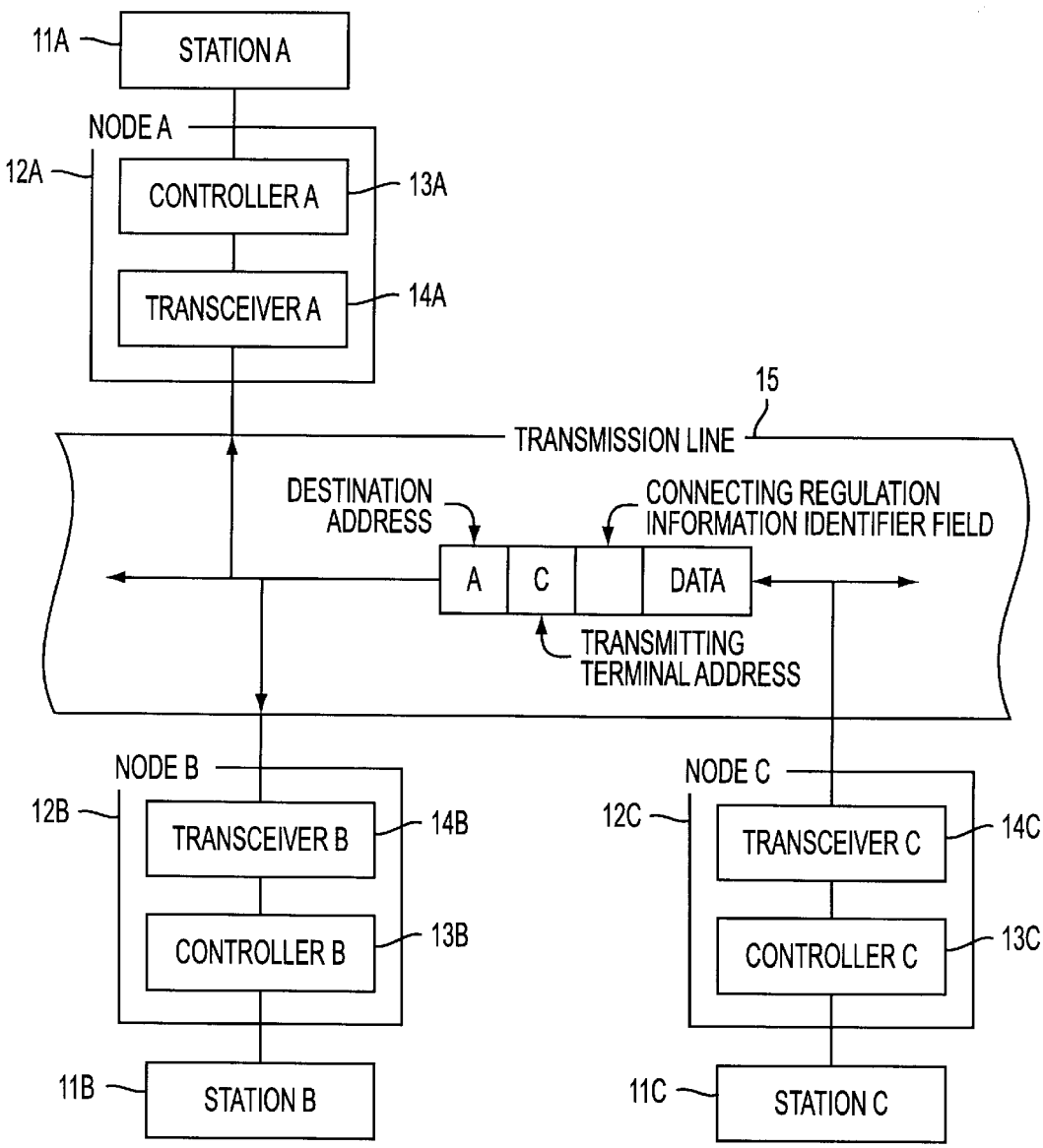
FIG. 2 is a block diagram illustrating a controller contained on a node in the first embodiment.

FIGS. 1 and 2 schematically illustrate a construction of a node in accordance with a first embodiment of the present invention, and a configuration of a LAN constructed of the nodes in the first embodiment.

As illustrated in FIG. 2, a node 12 includes a controller 13 and a transceiver 14 similarly to the prior art node. The controller 13 and the transceiver 14 are each connected to a station 11 and a transmission line 15. It should be noted that the LAN in the first embodiment is defined as a LAN based on the specification 10BASE2. Further, a disk top type computer is used by way of the station 11, and hence the node 12 is constructed as a board type apparatus inserted into an extension slot of the station 11. Moreover, the node 12 is so structured as to be fixed to the station 11 in such a form that values of a dip switch (which will hereinafter be explained in greater detail) provided inside are changed with a difficulty by persons excluding a LAN manager. To be more specific, the node 12 is so constructed as to be fixed to the station 11 in such a form that the node can not be removed from the station without a key.

The transceiver 14 in the node 12 incorporates the same functions as those of a typical transceiver. That is, the transceiver 14, when the packet is transferred from the controller 13, converts a signal packet of this packet and transmits it onto the transmission line. The transceiver 14, when the packet is transmitted via the transmission line, receives the packet, converts the signal form, and transfers it to the controller 13.

As shown in FIG. 1, the controller 13 includes, as principal components, a signal processing circuit 21, a central controller (CC) 22, a storage unit 23 and a dip switch 27. The signal processing circuit 21 is an electronic circuit for executing a process of structuring the communication data into a packet and a process reverse thereto at a high speed, and has the same configuration as a signal processing circuit provided in a typical controller. The central control unit 22 is a unit (a so-called CPU) for controlling the signal processing circuit 21. Under the control of this central control unit 22, the controller 13 operates as a device having a function (which will hereinafter be mentioned in greater detail) different from that of the typical controller.

The storage unit 23 includes a register 24, a RAM 25 and a ROM 26. As schematically illustrated in FIG. 1, the ROM 26 is previously stored with a self-LAN address (a MAC address) and with a connecting regulation program for determining operation procedures of the central control unit 22. The register 24 is connected to the dip switch 27, and the control unit 22 recognizes a set value of the dip switch 27 by reading a value of the register 24. The RAM 25 is used for storing connecting regulation information as well as for buffering the communication data. The connecting regulation information serves, although mentioned later on in detail, to specify (classify) a station with regulations in terms of communications and a station with no regulation in communications. The controller 13 is a device for executing also a process of the high-layer protocol, and hence the RAM 25 is used also for storing a program for setting the processing procedures and a self-network address. An illustration thereof is, however, omitted in FIG. 1.

The node 12, after predetermined values have been set in the dip switch 27, attached to the station 11. Concretely, when constructing the LAN by use of the nodes 12, at least one station (hereinafter terms a specified station) employed for the LAN manager setting the connecting regulation information, is selected among a plurality of stations 11 constituting the lan. The same address as the self-LAN address stored in the ROM 26 is set in the dip switch 27 within the node 12 attached to the specified station. An address (a LAN address of the node 12 attached to the specified station) of any one of the specified stations 11, is set in the dip switch 27 within the node 12 (the controller 13) attached to each station excluding the specified station.

For example, when constructing the LAN including one unit of specified station, the LAN address of this specified station (attached to the node) is set in the dip switches 27 within all the nodes. Further, in the case of constructing the LAN including two units of specified stations, the LAN address of one specified station is set in the dip switches 27 within a certain number of nodes, and the LAN address of the other specified station is set in the dip switches 27 within the remaining nodes.

Installed then into the specified station is a program (hereinafter referred to as a management program) for managing a connecting regulation condition and the setting of the connecting regulation information.

Herein, an operation of the node 12 will be specifically explained.

The operation of the node 12 (the central control unit 22 within the controller 13) when receiving a data transmitting indication from the station 11, will be now explained with reference to FIG. 3.

In this case, the central control unit 22 at first judges whether the transmitting indication given from the station 11 is a transmitting indication of the connecting regulation information or a normal data transmitting indication (step S101). Note that the management program installed into the specified station is a program for giving the indication to transmit the connecting regulation information to the node 12 (the controller 13), and therefore the nodes receiving the transmitting indication of the connecting regulation information are only the nodes attached to the specified stations.

If the transmitting indication given from the station 11 is the transmitting indication of the connecting regulation information (step S101; Y), the central control unit 22 judges whether or not the self-LAN address within the ROM 26 is coincident with a set value (a value of the register 24) of the dip switch 27 (step S102). Then, if the self-LAN address is not coincident with the set value of the dip switch set value (step S102; N), the central control unit 22 ignores the transmitting indication of the connecting regulation information and finishes the processing. Whereas if coincident with each other (step S102; Y), the central control unit 22 executes a process of transmitting a connecting regulation information packet (step S103).

Specifically, the central control unit 22 holds the connecting regulation information, creates the connecting regulation information packet in which a connecting regulation information identifier is set in a connecting regulation information identifier field, and requests the transceiver 14 to transmit the created packet. Herein, the connecting regulation information is defined as data contained in the transmitting indication of the connecting regulation information, and is either data for indicating a regulation of connections of all the stations with respect to the LAN addresses of a certain number of stations (the nodes) with no regulation of the connection (with a permission of the communications) or data for indicating a release of the connecting regulation. Further, the connecting regulation information identifier field is a field for distinguishing a packet holding the connecting regulation information from a packet holding the communication data. In accordance with the first embodiment, a so-called type field is utilized as the connection regulating information identifier field (see FIG. 1). Namely, the central control unit 22, when implementing the process in step S103, sets a specified piece of data (the connecting regulation information identifier) unused as a high-layer protocol identifier in the type filed (equal to the connecting regulation information identifier field). Incidentally, there will hereinafter be elucidated the operation of the node receiving the connecting regulation information packet and the reason why the node is constructed to confirm that the self-LAN address is coincident with the set value of the dip switch.

If the transmitting indication given is the normal data transmitting indication (step S101; N), the central control unit 22 judges based on the address of the data and the connecting regulation information within the RAM 25 whether or not the station that should transmit the data is a connecting regulation target station the communications of which are not permitted (the connection is regulated) (step S104). In step S104, the central control unit 22 judges that the station that should transmit the data is not the connecting regulation target station if the LAN address of the station that should transmit the data is not coincident with any of addresses stored as the connecting regulation information, and if no connecting regulation information is stored (if not stored with even one address). In the cases other than this, i.e., if stored with the connecting regulation information containing the same address as the LAN address of the station that should transmit the data, or if stored with the connecting regulation information for giving the indication to regulate the connections to all the stations, the central control unit 22 judges that the station which should transmit the data is the connecting regulation target station.

If the station to which the data indicated to be transmitted is addressed is not the connecting regulation target station (step S105; N), the central control unit 22 executes a packet transmitting process (step S106), and the processing comes to an end. Note that the central control unit 22, when executing the process in step S106, sets the normal high-layer protocol identifier in the type field (equal to the connecting regulation information identifier field). Whereas if the destination station is the connecting regulation target station (step S105; Y), the central control unit 22 finishes the processing without executing the packet transmitting process (while ignoring the data transmitting indication).

Figure 4:
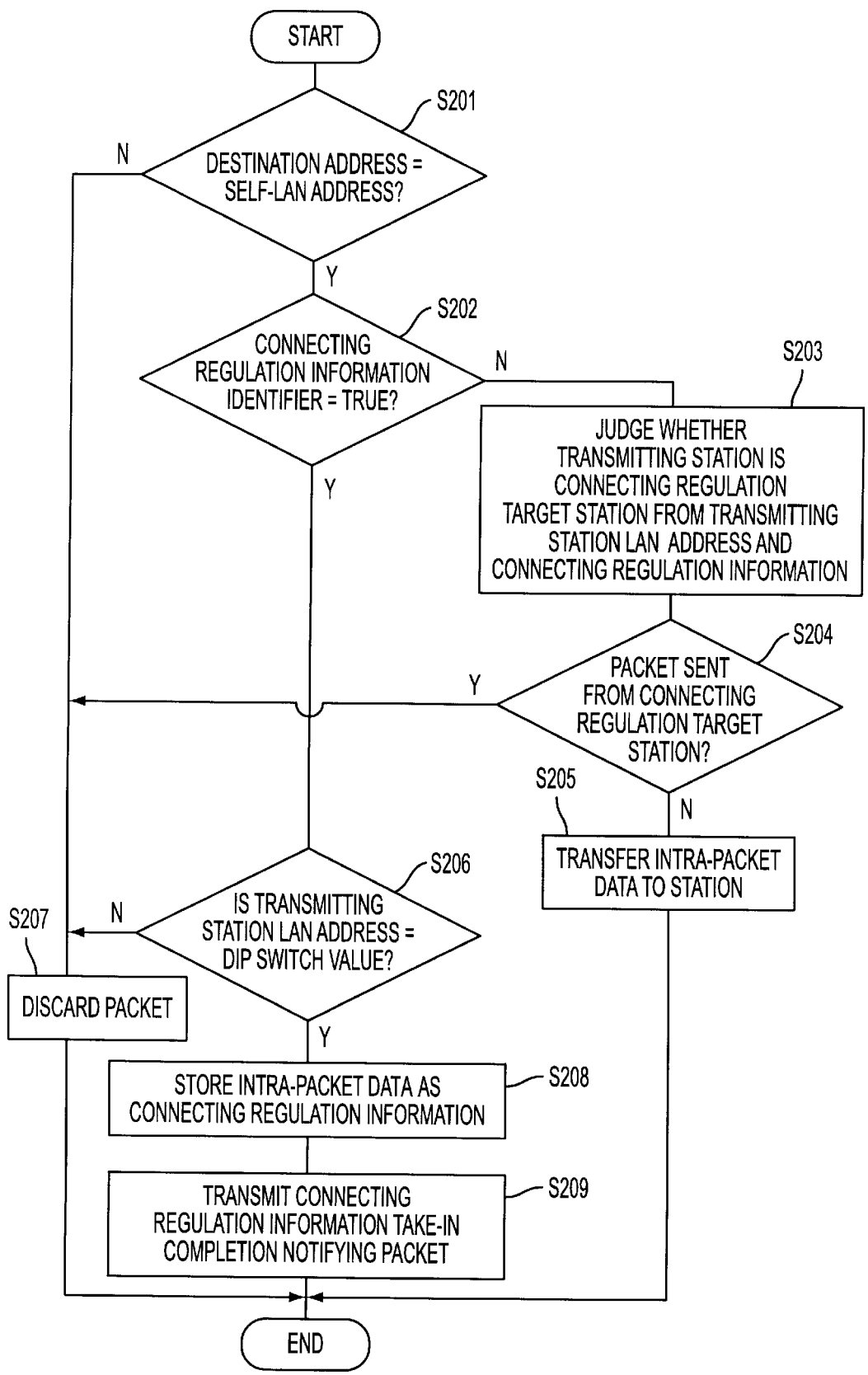
FIG. 4 is a flowchart showing operating procedures of the controller in the first embodiment.

Explained next referring to FIG. 4 is the operation (the operation of the central control unit 22 within the controller 13 when the packet is transferred from the transceiver 14) of the node 12 when receiving the packet.

In this case, the central control unit 22, to begin with, judges whether or not an intra-packet destination LAN address is coincident with the self-LAN address stored in the ROM 26 (step S201). Then, if the destination LAN address is not coincident with the self-LAN address (step S201; N), the packet is disposed of (step S207), and the processing comes to an end.

Whereas if the destination LAN address is coincident with the self-LAN address (step S201; Y), the central control unit 22 judges whether or not the connecting regulation information identifier is set in the connecting regulation information identifier field of the packet (step S202). If the packet is a packet in which the connecting regulation information identifier is not set (step S202; N), i.e., when being the packet holding the communication data, the central control unit 22 judges based on the intra-packet transmitting LAN address and the connecting regulation information in the RAM 25 whether or not the received packet is a packet sent from the connecting regulation target station (step S203).

The judgement in step S203 is made in the same procedure as the judgement in step S104. Namely, if the intra-packet transmitting LAN address is not coincident with any of addresses as the connecting regulation information, and if the connecting regulation information is not stored (if not stored with even one address), the central control unit 22 judges that the received packet is the one sent from the connecting regulation target station.

If the packet is the one sent from the connecting regulation target station (step S204; Y), the central control unit 22 disposes of this packet (step S207), and finishes the processing. Whereas if the packet is not the one sent from the connecting regulation target station (step S204; N), the central control unit 22 executes the control to transfer the intra-packet data to the station 31 (step S205), and finishes the processing.

When the connecting regulation information identifier is set in the connecting regulation information identifier field of the packet (step S202; Y), the central control unit 22 judges whether or not the transmitting LAN address is coincident with the set value of the dip switch 27 by comparing a value in the register 24 with the intra-packet transmitting LAN address (step S206).

Then, if the intra-packet transmitting LAN address is not coincident with the set value of the dip switch (step S206; N), the packet (the connecting regulation information packet) is disposed of (step S207), and the processing is finished. Whereas if the intra-packet transmitting LAN address is coincident with the set value of the dip switch (step S206; Y), the central control unit 22 stores the RAM 25 with the data in the received packet as the connecting regulation information (step S208). Subsequently, the central control unit 22 executes a process of sending a connecting regulation information take-in completion notifying packet addressed to a specified station that has sent the connecting regulation information packet (step S209), and finishes the processing. Note that the connecting regulation information identifier is not set in the connecting regulation information take-in completion notifying packet and is, besides, a packet holding the data giving an indication of being the connecting regulation information take-in completion notifying packet. Namely, the connecting regulation information take-in completion notifying packet is such a packet that the intra-packet data is transferred to a specified station.

Elucidated herein is a reason why the node 12 is constructed to make a judgement involving the use of the dip switch set values hen receiving an indication to transmit the connecting regulation information and when receiving a packet (herein referred to as a connecting regulation information packet) in which the connecting regulation information identifier is set.

The thus constructed node is intended to prevent the connecting regulation from being illegally implemented (the connecting regulation is released) by use of the stations exclusive of the specified stations. That is, if the management program installed into the specified station is copied into other station, it follows that it is feasible to indicate the node attached to the program-copied station to transmit the connecting regulation information by use of this station. However, the set value of the intra-node dip switch is different from the self-LAN address within the RAM, and hence the node ignores the indication to transmit the connecting regulation information (see step S102). Accordingly, an operation of changing the set value of the intra-node dip switch is required in addition to the operation of copying the management program in order to implement the connecting regulation in the station other than the specified station.

Moreover, even when the set value of the intra-node dip switch is changed, the transmitting LAN address of the connecting regulation information sent from that node is different from a LAN address of the specified station. Therefore, it follows that the node attached to the destination station of the connecting regulation information packet disposes of this packet (see step S206). Eventually, in the LAN using the nodes in the first embodiment, the set values of dip switches of both of the transmitting node and the receiving node of the connecting regulation information packet, must be changed in order to rewrite the connecting regulation information by use of the station excluding the specified station. As already explained, however, the nodes are attached to the stations in such a form that the operation of changing the set values of the dip switches can not be easily changed. It is therefore feasible to prevent, if the nodes in the first embodiment are employed, the connecting regulation from being illegally conducted (from being released) using the station other than the specified station.

The operation (usage) of the LAN constructed of the nodes in the first embodiment will hereinafter be described in much more specifically by exemplifying a LAN constructed of eight units of nodes in the first embodiment. Further, a supplementary explanation of the management program installed into the specified station will be given in combination. Incidentally, in the following discussion, the eight nodes are represented such as nodes A–H, and the stations fitted with the respective nodes are expressed such as stations A–H. Further, it should be assumed that only the station A is the specified station.

When switching ON a power supply of each station, significant pieces of connecting regulation information are not stored in the respective nodes (not stored with the LAN address. Therefore, in this status, it might neither happen that the node ignores the data transmitting indication from the station nor happen that a packet to be sent to a certain station is disposed of by the node connected to the same station. Namely, the LAN comprising the nodes A–H, the stations A–H and the transmission line functions in the same manner as the ordinary LAN.

Now, when trying to restrict the communications between the stations B–H to perform a test etc, a manager indicates the node A to transmit, to each of the stations B–H (the nodes B–H), the connecting regulation information packet retentive of the connecting regulation information for permitting only the communications with the node A itself, i.e., the connecting regulation information packet retentive of the LAN address of the node A.

Figure 3:
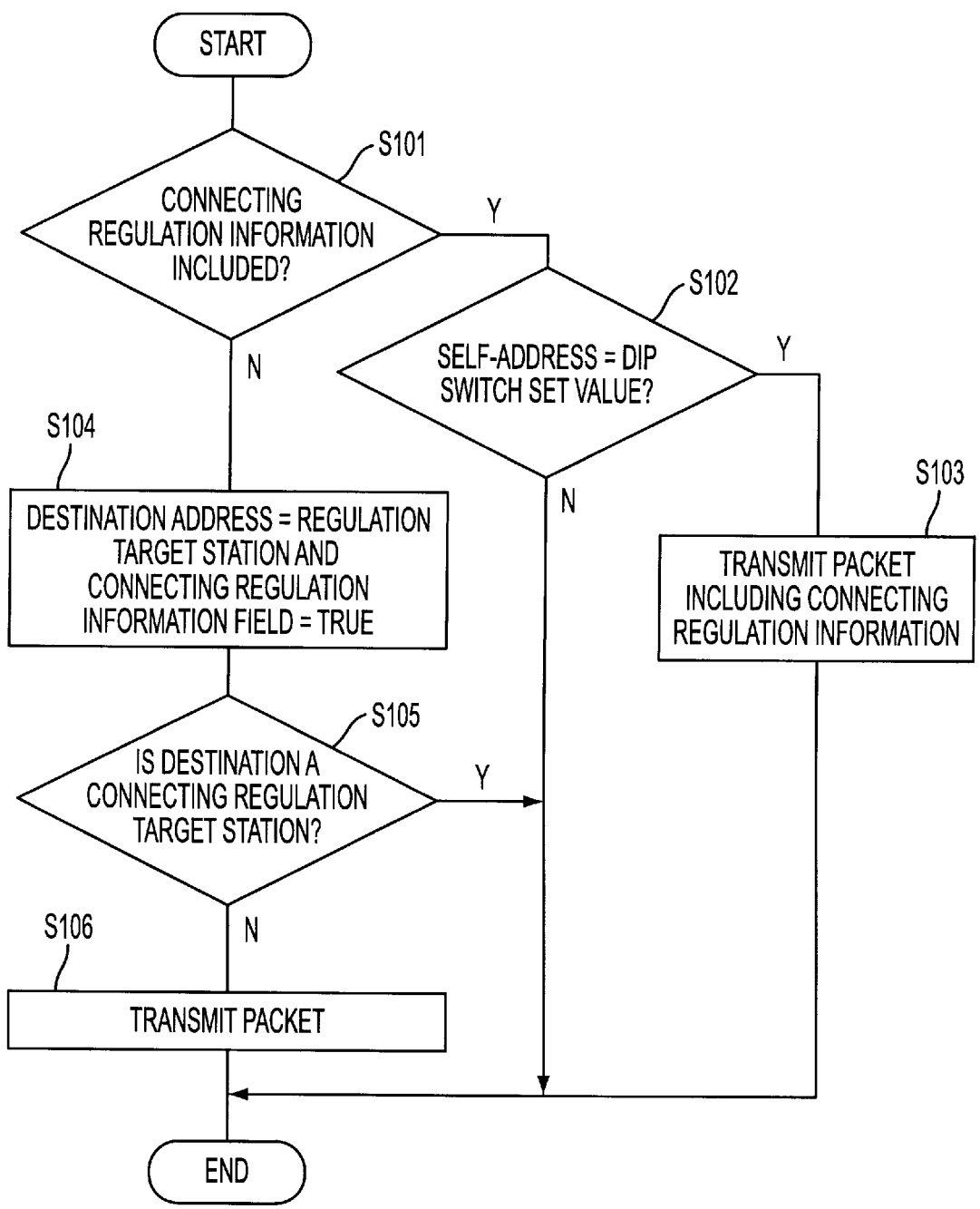
FIG. 3 is a flowchart showing operating procedures of the controller in the first embodiment when transmitting a packet.

As explained in FIG. 3, the node A (the controller) receiving the connecting regulation information transmitting indication, after confirming that the self-LAN address is coincident with the set value of the dip switch, executes the process of transmitting the connecting regulation information packet.

The connecting regulation information packet sent by the specified station A is received by a node (e.g., the node B) having the destination LAN address set in the packet. The node B, because of the connecting regulation information identifier being set in the packet, recognizes that the received packet is the connecting regulation information. Further, the intra-packet transmitting LAN address is coincident with the set value of the dip switch, and hence the node B judges that it is the connecting regulation information packet from a valid specified station and stores inside the intra connecting information packet data (the LAN address of the station A) as a piece of connecting regulation information. As a result, the station B shifts to a status in which only the communications with the station A are permitted. Then, the node B, after recording the connecting regulation information, executes the process of transmitting a connecting regulation information take-in completion notifying packet addressed to the transmitting station of the connecting regulation information packet.

The nodes C–H also operate in the same way as the Node B, and therefore, in the end, the node A receives seven pieces of connecting regulation information take-in completion notifying packets set by the nodes B–H if all the nodes B–H would be operating.

As discussed above, the connecting regulation information take-in completion notifying packet is the one in which the connecting regulation information identifier is not set. Therefore, the node A, when receiving the connecting regulation information take-in completion notifying packet, diverges on an "N" side in step S202. Further, the RAM of the node A is stored with no significant connecting regulation information, and hence the node A diverges on the "N" side in step S204. Namely, the node A transfers to the specified station A the data purporting a completion of the setting of the connecting regulation information contained in the connecting regulation information take-in completion notifying packet.

The management program in the specified station displays the same data on a screen of the specified station by making the data corresponding to identifying information of the station designated by the manager as the one that should implement the connecting regulation. The manager judges whether or not the setting of the connecting regulation information is completed on the basis of the information displayed on the screen of the specified station A. Then, when the completion of the storage of the connecting regulation information in all the stations requiring the connecting regulations is confirmed, the manager transmits test questions etc to the stations B–H. Then, when the test is completed (when receiving the answer from each station), the connecting regulation information packet for indicating a release of the connecting regulation is sent to each node, and the LAN status reverts to a normal status.

Considered also is a case in which only a certain number of stations are used for the test. In such a case, communication regulation information for permitting only the communications with the specified stations is set in only the stations (the nodes) used for the test. For example, if only the stations B–E are used for the test in the LAN constructed as described above, connecting regulation information consisting of only the LAN address of the station A is set in the nodes B–E. In the case of carrying out this setting, the stations F–H are each capable of sending the packets with respect to any other stations. When receiving the packets transmitted by the stations F–H, however, the nodes B–E dispose of these packets, and therefore the users of the stations B–E are unable to receive the data from the users of the stations F–G. Further, the stations F–G are capable of receiving the packets any other stations. However, the nodes B–E, when receiving an indication to transmit the data addressed to the stations F–G, ignore this indication. Accordingly, it follows that the desired communication regulation can be eventually attained without the users of the stations F–G receiving the data from the users of the stations B–E.

It is to be noted that it is taken for granted that when only the stations B–E are used for the test, communication regulation information for permitting only the communications with the stations G, H, the stations F, H and the stations F, G may be set in each of the nodes G, G and H in order not to transmit futile packets onto the transmission line.

Moreover, it is feasible to utilize the communication regulations to efficiently conduct the conference using the LAN. For instance, there is considered a case in which the conference is conducted between the stations F–H in the LAN having the construction described above. If this conference is carried out without regulating the communications, it can be considered that the packets not related to the conference might be transmitted to the stations F–H. Further, the transmission of the packets relative to the conference might be kept waiting due to existences of the packets not related to the conference on the transmission line, and the packets might be required to be retransmitted. When the communication regulations are implemented, however, it follows that an occurrence of such a phenomenon can be prevented. To be specific, for example, the occurrence of the above phenomenon is eliminated by setting in each of the stations B–E regulation information for permitting only the communications with the stations excluding the stations F–H, or communication regulation information for inhibiting the communications with all other stations, whereby the conference etc can be conducted efficiently.

Second Embodiment

The node in the first embodiment implements the connecting regulations through the LAN address (the MAC address; the layer-2 address). By contrast, the node in a second embodiment carries out the connecting regulation through a network address (a layer-3 address).

Figure 5:
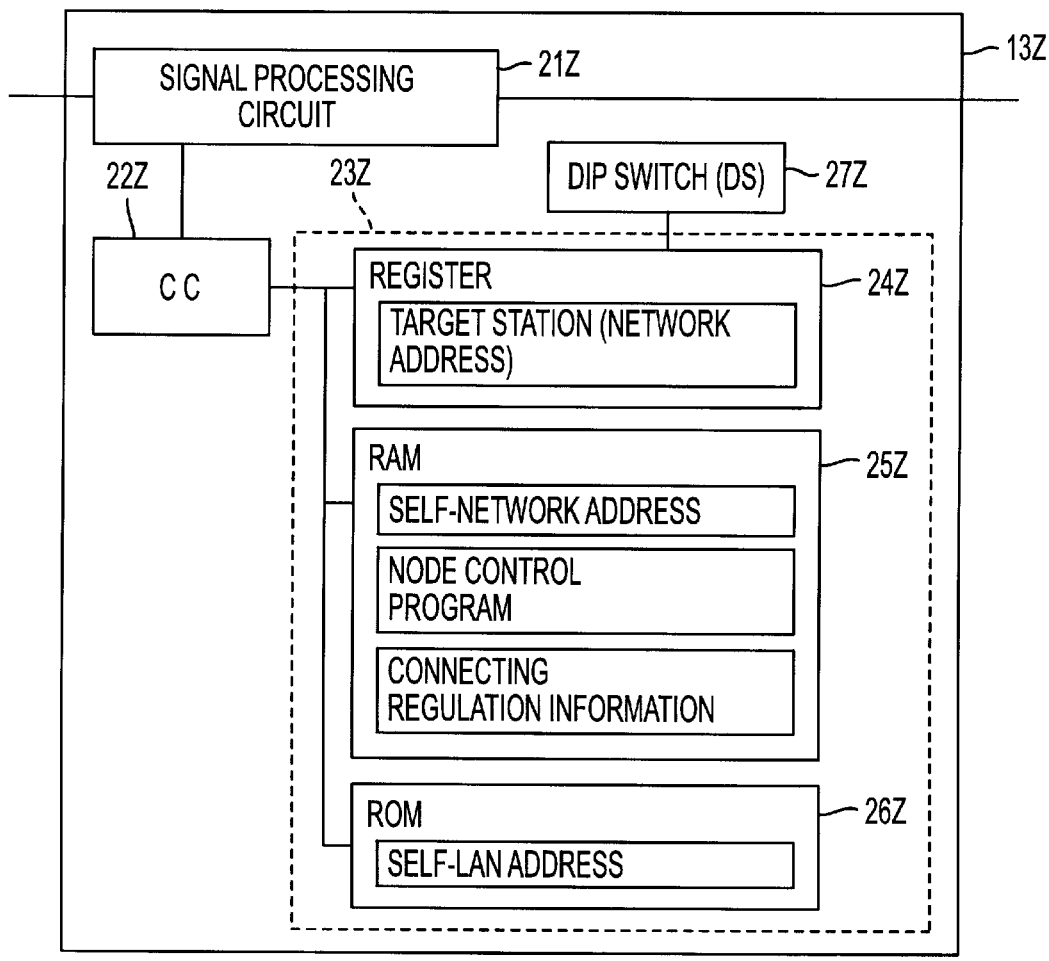
FIG. 5 is a block diagram illustrating the controller included in the node in a second embodiment.

FIG. 5 is a block diagram showing a controller 132 included in the node in accordance with the second embodiment. As illustrated in FIG. 5, a fundamental circuit construction of the controller 132 is much the same as the circuit construction (see FIG. 1) of the node in the first embodiment, and hence the node construction in the second embodiment will be explained by showing a difference therebetween.

The node (the controller) of the first embodiment is constructed so that the ROM is stored with the connecting regulation program and the RAM is stored with the program for supporting the high-layer protocol. In the node in accordance with the second embodiment, however, there is used a high-layer protocol support program (hereinafter termed a node control program) in which a control procedure needed for the connecting regulation is also defined, and therefore a RAM 262 is not stored with the connecting regulation program while a RAM 252 is stored with a node control program. The node control program and a self-network address are, upon switching ON the power supply of the station, loaded into the RAM 252 from the storage device within the station. Then, a central control unit 222, when receiving a data transmitting indication from the station, or when the transceiver receives the packet, executes control of a signal processing circuit 212 based on the node control program.

When the LAN is constructed using the nodes also in the second embodiment, (at least) a certain number of stations capable of setting the connecting regulation information are, as in the first embodiment, determined among the stations used for constructing the LAN. However, not the LAN address but a network address of the specified station is set in a dip switch 272 within the controller 132 attached to this specified station. Further, a network address of any of the specified stations is set also in a dip switch 272 within the controller 132 attached to the station other than the specified station.

Installed then in the specified station is the management program for setting the connecting regulation information and managing a connecting regulation condition on the basis of the connecting regulation information. This management program is substantially the same as the management program installed into the specified station in the first embodiment except for such a point as to output data consisting of the network address as the connecting regulation information.

The operation of the node in the second embodiment will be now specifically explained with reference to a flowchart.

Figure 6:
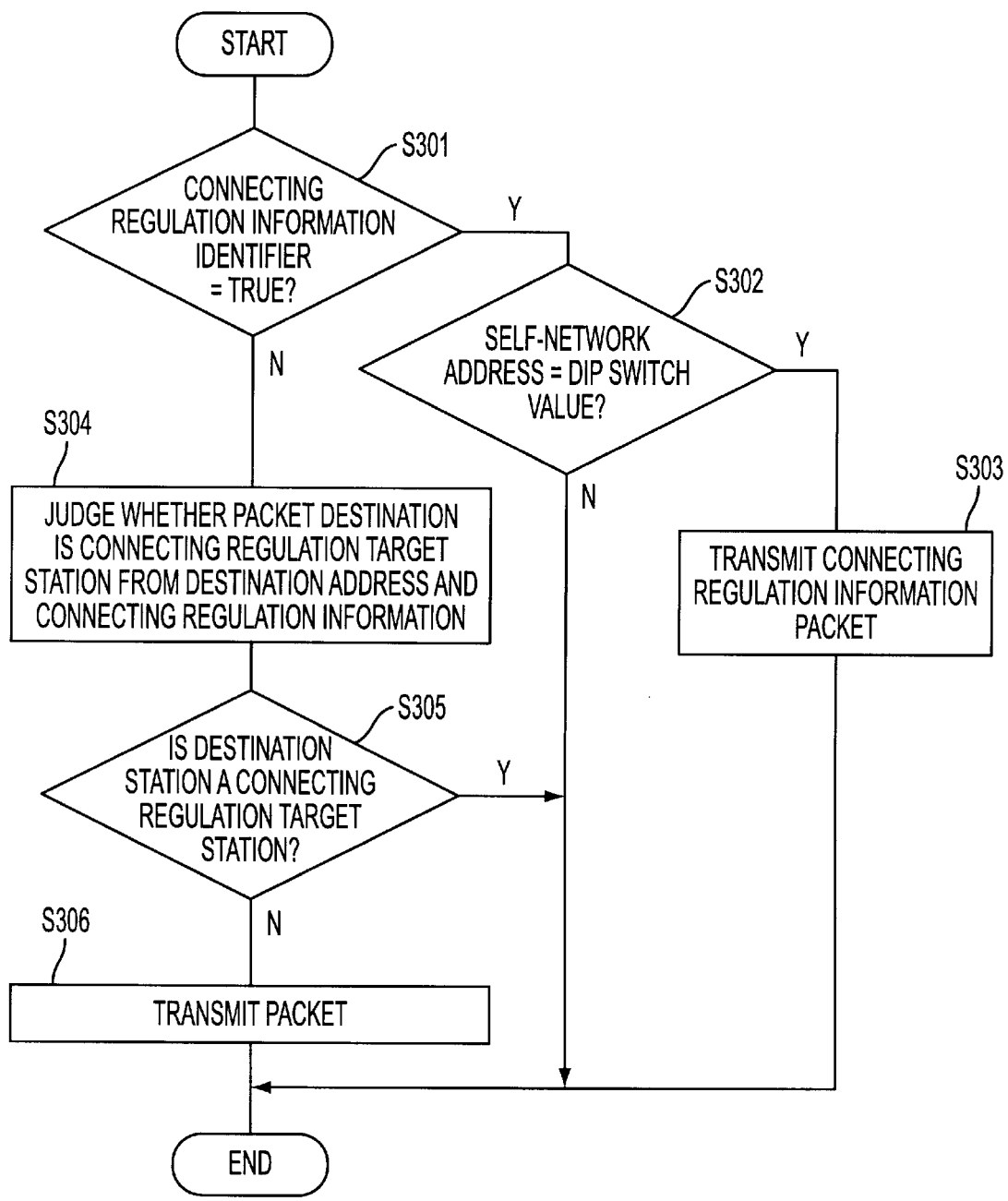
FIG. 6 is a flowchart showing operating procedures of the controller in the second embodiment when transmitting the packet.

To begin with, the operation of the node (the central control unit 222 within the controller 132) in the second embodiment when receiving the data transmitting indication from the station, will be explained in conjunction with FIG. 6.

In this case, the central control unit 222 at first judges whether or not the transmitting indication given from the station is a connecting regulation information transmitting indication or a normal data transmitting indication (step S301). If the transmitting indication given from the station is the connecting regulation information transmitting indication (step S301; Y), the central control unit 222 judges whether or not a self-network address within the RAM 252 is coincident with a set value (a value of a register 242) of the dip switch (step S302). Then, if not coincident with each other (step S302; N), the central control unit 222 ignores the connecting regulation information transmitting indication, and finishes the processing. Whereas if coincident with each other (step S302; Y), the central control unit 222 executes a process of transmitting the connecting regulation information packet (step S103). The connecting regulation information packet transmitted in this step is, as obvious from the description of the above management program, a packet holding either the data for indicating the regulation of the connections of all the stations with respect to the network addresses of a certain number of stations (the nodes) which do not regulate the connections (which permit the communications) or the data for indicating the release of the connecting regulation. The above connecting regulation information packet is also a packet in which the connecting regulation information identifier is set in the connecting regulation information identifier field (the type field).

If the transmitting indication given is the normal data transmitting indication (step S301; N), the central control unit 222 judges based on the destination of the data and the connecting regulation information whether or not the station that should transmit the data is a connecting regulation target station (step S304). In step S304, the central control unit 222 judges that the station that should transmit the data is not the connecting regulation target station if the network address of the station that should transmit the data is not coincident with any of addresses stored as the connecting regulation information, and if no connecting regulation information is stored (if not stored with even one address). In the cases other than this, i.e., if stored with the connecting regulation information containing the same address as the network address of the station that should transmit the data, or if stored with the connecting regulation information for giving the indication to regulate the connections to all the stations, the central control unit 222 judges that the station which should transmit the data is the connecting regulation target station.

If the station to which the data given an indication to be transmitted is addressed is not the connecting regulation target station (step S305; N), the central control unit 222 executes a packet transmitting process (step S306), and finishes the processing. Whereas if the destination station is the connecting regulation target station (step S305; Y), the central control unit 222 finishes the processing without executing the packet transmitting process (while ignoring the data transmitting indication).

Figure 7:
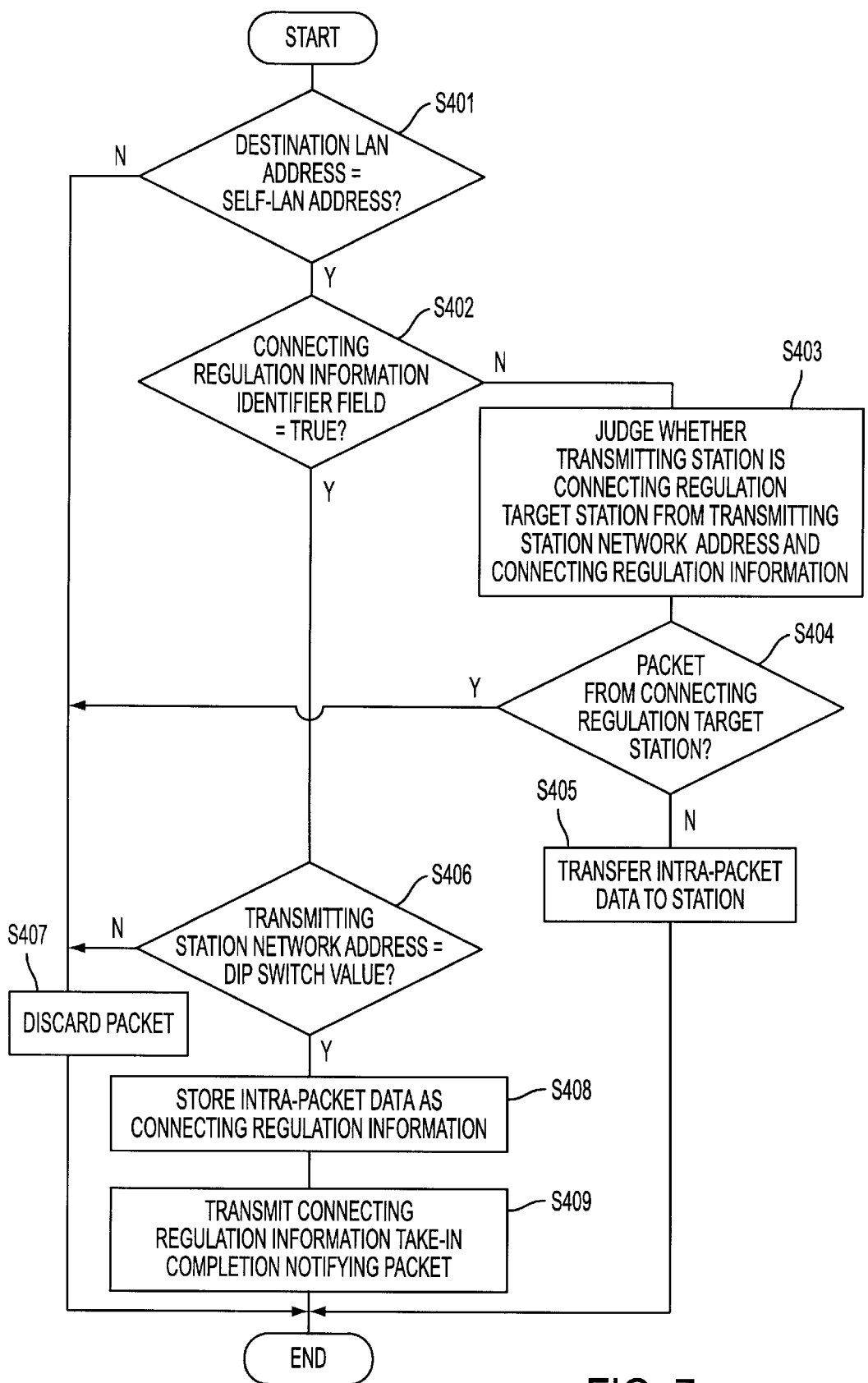
FIG. 7 is a flowchart showing operating procedures of the controller in the second embodiment when receiving the packet.

With reference to FIG. 7 the operation (the operation of the central control unit 222 within the controller 132 when the packet is transferred from the transceiver) of the node in the second embodiment when receiving the packet will be now explained.

In this case, the central control unit 222, to begin with, judges whether or not an intra-packet destination LAN address is coincident with the self-LAN address stored in the ROM 262 (step S401). Then, if the destination LAN address is not coincident with the self-LAN address (step S401; N), the packet is disposed of (step S407), and the processing comes to an end.

If the destination LAN address is coincident with the self-LAN address (step S401; Y), the central control unit 222 judges whether or not the connecting regulation information identifier is set in the connecting regulation information identifier field of the packet (step S402). If the packet is a packet in which the connecting regulation information identifier is not set (step S402; N), i.e., when being the packet holding the communication data, the central control unit 222 judges based on the intra-packet transmitting LAN address and the connecting regulation information in the RAM 252 whether or not the received packet is a packet sent from the connecting regulation target station (step S403). The judgement in step S403 is made in the same procedure as the judgement in step S304.

If the packet is the one sent from the connecting regulation target station (step S404; Y), the central control unit 222 disposes of this packet (step S407), and finishes the processing. If the packet is not the one sent from the connecting regulation target station (step S404; N), the central control unit 222 executes the control to transfer the intra-packet data to the station 31 (step S405), and finishes the processing.

When the connecting regulation information identifier is set in the connecting regulation information identifier field of the packet (step S402; Y), the central control unit 222 judges whether or not the transmitting network address is coincident with the set value of the dip switch 272 by comparing a value in the register 242 with the intra-packet transmitting network address (step S406).

Then, if the intra-packet transmitting network address is not coincident with the set value of the dip switch (step S406; N), the packet is disposed of (step S407), and the processing is finished. Whereas if the intra-packet transmitting network address is coincident with the set value of the dip switch (step S406; Y), the central control unit 222 stores the RAM 252 with the data in the received packet as the connecting regulation information (step S408). Subsequently, the central control unit 222 executes a process of sending a connecting regulation information take-in completion notifying packet addressed to a specified station that has sent the connecting regulation information packet (step S409), and finishes the processing. Note that the connecting regulation information take-in completion notifying packet set in this step is absolutely the same as the connecting regulation information take-in completion notifying packet sent by the node in the first embodiment.

The same connecting regulation as the connecting regulation implemented by the node in the first embodiment can be carried out with respect to the stations connected via a router by use of the node in the second embodiment.

Namely, if the router is included in the first LAN constructed by use of the nodes in the first embodiment, the LAN address (the MAC address) of the packet transmitting station is not contained (a LAN address of the router is set) in the packet inputted from the second LAN via the router. Therefore, in the case of using the nodes in the first embodiment, the communications can be regulated so that a certain number of stations within the first LAN are not allowed to communication with all the stations within the second LAN. It is, however, impossible to regulate that communications so that a certain number of stations within the first LAN are allowed to communicate with desired stations within the second LAN. By contrast, the node in the second embodiment implements the connecting regulation through the network address, and hence it follows that the same connecting regulation as the connecting regulation carried out by the node in the first embodiment can be implemented with respect to the stations connected via the router if the nodes in the second embodiment are employed.

Third Embodiment

A node is a modified version of the node in the second embodiment, wherein the function to make the judgement based on the connecting regulation information when receiving the packet is eliminated from the node in the second embodiment.

Figure 8:
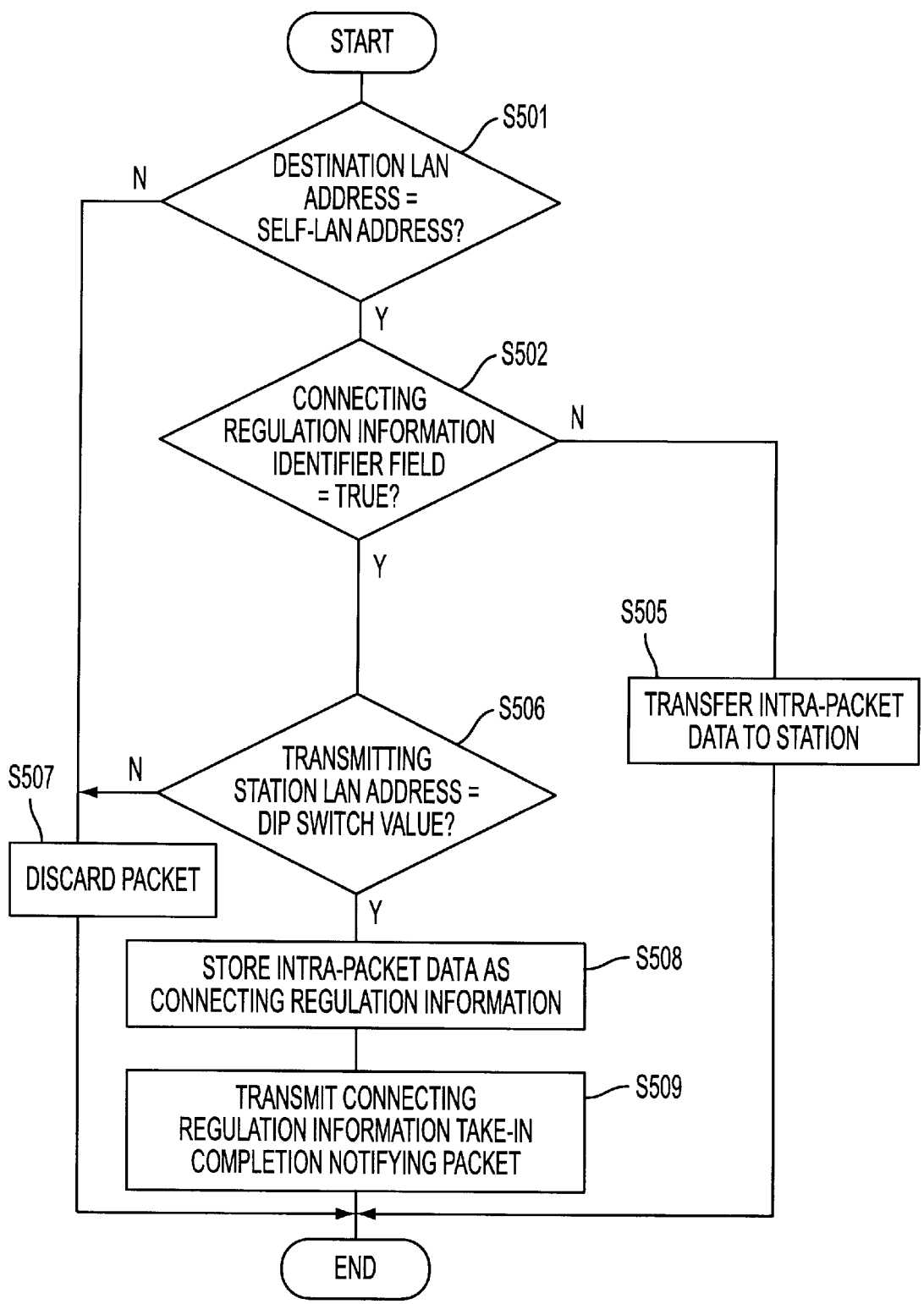
FIG. 8 is a flowchart showing operating procedures of the controller in a third embodiment when receiving the packet.

That is, the node in the third embodiment operates absolutely the same as the node in the second embodiment when transmitting the packet. Then, the node in the third embodiment, when receiving the packet, as shown in FIG. 8, if the destination LAN address is coincident with the self-LAN address (step S501; Y) and the packet is a packet in which the connecting regulation information identifier is not set (step S502; N), executes the control to transfer, whatever packet transmitting station it may be, the intra-packet data to the station (step S505).

It is feasible to construct the LAN by use of the nodes in the third embodiment, which is capable of implementing substantially the same connecting regulation as when using the nodes in the first and second embodiments.

For example, it should be assumed that the LAN is constructed of eight nodes in the third embodiment. Note that for explanatory convenience, the eight nodes are represented such as nodes A–H, and the stations connected to the respective nodes are expressed such as stations A–H. Further, it should be also presumed that only the station A is the specified station.

In the case of trying to restrict the communications between the stations B–H in order to perform a test etc in the thus constructed LAN, the connecting regulation information for permitting only the communications with the station A may be set in each of the stations B–H (the nodes B–H). The reason why is that this setting eliminates a possibility in which a packet required to be disposed of based on the connecting regulation information might be received by the nodes B–H.

If the stations used for the test are, however, limited to a certain number of stations, although the connecting regulation information for permitting only the communications with the station A may be set in these stations in the LAN using the nodes in the first or second embodiment, it is required that the connecting regulation information be also set in the stations excluding the stations used for the test in the LAN using the nodes in the third embodiment.

For instance, if the connecting regulation information consisting of only the network address of the station A is sent in the nodes B–E when only the stations B–E are used for the test in the above-constructed LAN, the stations B–E are incapable of transmitting the packets to the stations F–G but capable of receiving the packets from the stations F–G. If set in a status capable of performing, though one-sided, such communications, it is not desirable in terms of a purpose for regulating the communications in this case. Accordingly, in the case of actualizing the above connecting regulation, it is required that the communication regulation information for permitting only the communications with the stations G, H, the stations F, G and the stations F, G be also set in each of the nodes F, G, H.

Namely, the LAN requiring a longer time for the connecting regulation is constructed by use of the nodes in the third embodiment than by using the nodes in the first and second embodiments. Further, in the LAN using the nodes in the third embodiment, the setting of the connecting regulation information is completed in the status in which a power supply of a certain station is not yet switched ON, and thereafter, if the power supply of the same station is switched ON, the data is transferred to the station under the connecting regulation by use of the above station. In the case of trying to prevent such a problem from arising, the nodes in the first or second embodiment should be employed.

Fourth Embodiment

A node in a fourth embodiment is a modified version of the node in the second embodiment, wherein the function to make the judgement based on the connecting regulation information when transmitting the packet is eliminated from the node in the second embodiment.

Figure 9:
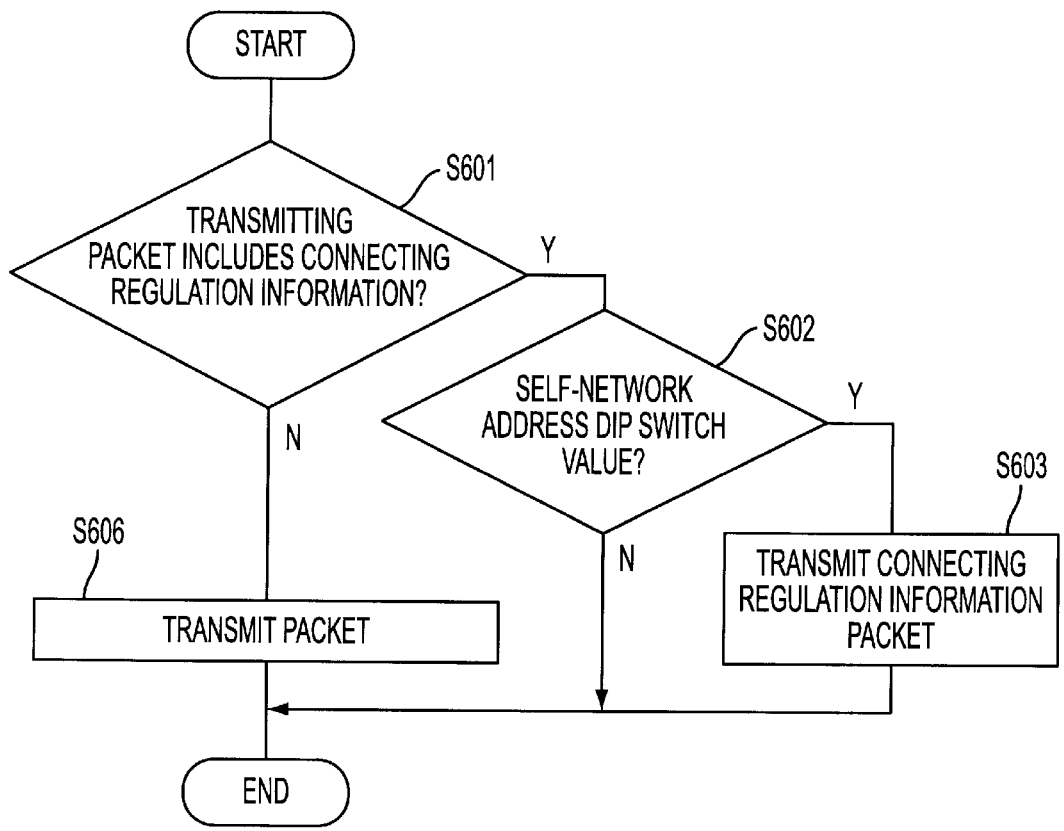
FIG. 9 is a flowchart showing operating procedures of the controller in a fourth embodiment when transmitting the packet.
Figure 10:
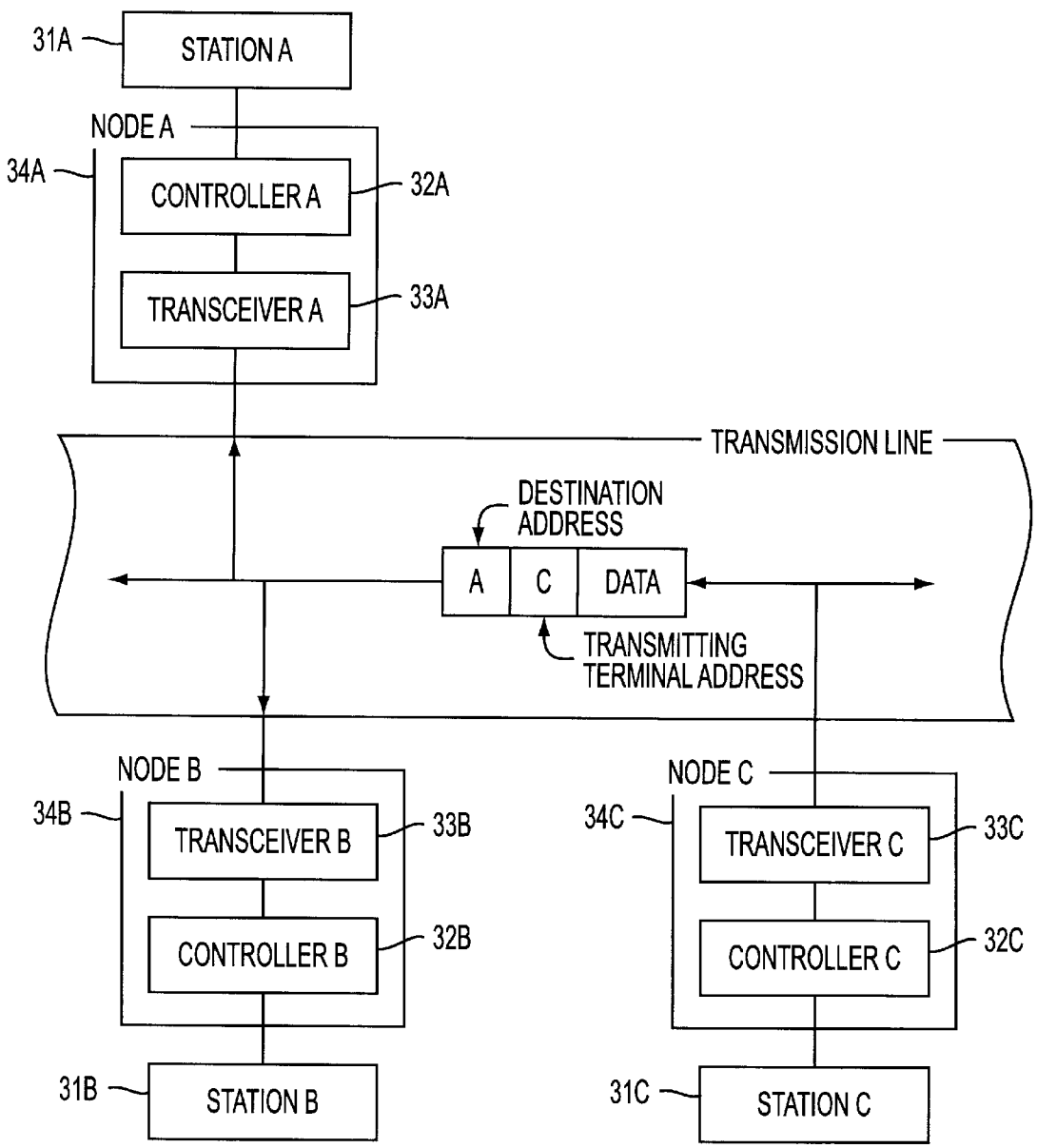
FIG. 10 is an explanatory diagram illustrating a prior art LAN.

That is, the node in the fourth embodiment operates absolutely the same as the node of the second embodiment when receiving the packet. Then, the node in the fourth embodiment, when transmitting the packet, as shown in FIG. 9, in the case of receiving a normal data transmitting indication (step S601; Y), executes the control to transmit, whatever destination station it may be, the data to the destination station (step S606).

It is feasible to construct the LAN by use of the nodes in the fourth embodiment, which is capable of implementing substantially the same connecting regulation as when using the nodes in the first and second embodiments.

For example, it should be assumed that the LAN is constructed of eight nodes in the fourth embodiment. Note that for explanatory convenience, the eight nodes are represented such as nodes A–H, and the stations connected to the respective nodes are expressed such as stations A–H.

Further, it should be also presumed that only the station A is the specified station.

In the case of trying to restrict the communications between the stations B–H in order to perform a test etc in the thus constructed LAN, the connecting regulation information for permitting only the communications with the station A may be set in each of the stations B–H (the nodes B–H). The reason why is that if set in this way, when the packet addressed to any one of the stations B–H is transmitted from the stations B–H, this packet is disposed of by the node connected to the destination station.

If the stations used for the test are, however, limited to a certain number of stations, although the connecting regulation information for permitting only the communications with the station A may be set in these stations in the LAN using the nodes in the first or second embodiment, it is required that the connecting regulation information be also set, as in the first embodiment, in the stations excluding the stations used for the test in the LAN using the nodes in the fourth embodiment. Namely, the LAN requiring a longer time for the connecting regulation is constructed, as in the case of using the nodes in the third embodiment, by use of the nodes in the fourth embodiment than by using the nodes in the first and second embodiments. Further, in the LAN using the nodes in the fourth embodiment, it follows that the packet disposed on in any node is to be sent onto the transmission line. That is, when using the nodes in the fourth embodiment, a reduction in quantity of the packets sent onto the transmission line can not be attained.

Modified Embodiment

The nodes (the controllers) in the first through fourth embodiments can be modified in a variety of forms. For example, the node may be so constructed as not to make the comparison between the address and the dip switch set value, which comparison is to be executed when receiving and transmitting the connecting regulation information packet. Moreover, the node may be constructed so as to store, as a piece of connecting regulation information, an address of the station that does not permit the communications, or may be constructed so that an address of the station permitting the data transmission and an address of the station permitting the data receipt, can be separately set. Further, the node may also be constructed so that data composed of a pair of a transmitting-side address and a destination address is stored as a piece of communication regulation information.

Furthermore, the nodes in the first through fourth embodiments take the card type but may take a box type. Additionally, the station may be allowed to execute a part of the processes implemented by each node. Namely, the node and the station may be constructed so that a unit consisting of the node and the station incorporates the same function as that of the node shown in each embodiment.

It is apparent that, in this invention, a wide range of different working modes can be formed based on the invention without deviating from the spirit and scope of the invention. This invention is not restricted by its specific working modes except being limited by the appended claims.

What is claimed is:

1. A communication apparatus, connected to a terminal and a transmission line of a local area network, for allowing said terminal to function as one communication terminal of said local area network, said apparatus comprising:

communication regulation information storing means for storing communication regulation information defined as information for classifying other communication terminals connected to said local area network into a communication terminal permitted to communicate and a terminal not permitted to communicate in accordance with a network address;

take-in means for taking in communication data addressed to a self-terminal from the transmission line on the basis of a receiving LAN address contained in the communication data propagating through the transmission line;

judging means for judging, based on a transmitting network address contained in the communication data taken in by said take-in means and the communication regulation information within said communication regulation information storing means, whether or not a terminal of transmitting the communication data is a communication terminal permitted to communicate; and supplying means for supplying said terminal with only a content of the communication data transmitted by said terminal judged as the communication terminal permitted to communicate.

2. A communication apparatus according to claim 1, further comprising:

transmitting destination judging means for, when indicated to transmit data from said terminal, judging whether or not a data transmitting destination is said communication terminal permitted to communicate, on the basis of the network address of said communication terminal to which the relevant data is transmitted and the communication regulation information within said communication regulation information storing means; and sending means for sending, onto the transmission line, communication data corresponding to the data indicated to be transmitted only when said transmitting destination judging means judges that said data transmitted terminal is said communication terminal permitted to communicate.

3. A communication apparatus according to claim 1, wherein the communication data includes a field in which to set a connecting regulation information identifier showing whether or not the communication data is communication data holding the connecting regulation information, and said apparatus further comprising:

communication regulation information setting means for, when said take-in means takes in the communication data having a connecting regulation information identifier showing that the data is the communication data holding the connecting regulation information, setting data contained in the communication data as communication regulation information in said communication regulation information storing means.

4. A communication apparatus according to claim 3, wherein said communication regulation information setting means, when the communication data taken in by said take-in means has a connecting regulation information identifier showing that the data is the data holding the connecting regulation information and has the same transmitting network address as a preset network address, sets data contained in the communication data as communication regulation information in said communication regulation information storing means.

5. A communication apparatus according to claim 3, further comprising:

a dip switch for setting the network address, wherein said communication regulation information setting means, when the communication data taken in by said take-in means has a connecting regulation information identifier showing that the data is the data holding the connecting regulation information and has the same transmitting network address as a network address set in said dip switch, sets data contained in the communication data as communication regulation information in said communication regulation information storing means.

6. A communication apparatus according to claim 3, further comprising:

setting completion notifying means for transmitting, when said communication regulation information setting means sets the communication regulation information, communication data indicating that setting of the communication regulation information is completed, to said communication terminal having sent the communication data holding the connecting regulation information.

7. A communication apparatus, connected to a terminal and a transmission line of a local area network, for allowing said terminal to function as one communication terminal of said local area network, said apparatus comprising:

communication regulation information storing means for storing communication regulation information defined as information for classifying other communication terminals connected to said local area network into a communication terminal permitted to communicate and a terminal not permitted to communicate in accordance with a LAN address;

take-in means for taking in communication data propagating via the transmission line and containing a receiving LAN address and a transmitting LAN address;

first judging means for judging whether or not a receiving LAN address taken in by said take-in means is coincident with a self-LAN address defined as a self-given LAN address;

second judging means for judging whether or not a communication data transmitting terminal is a communication terminal permitted to communicate on the basis of a transmitting LAN address of the communication data in which the receiving LAN address is judged as being coincident with the self-LAN address by said first judging means and the communication regulation information within said communication regulation information storing means; and supplying means for supplying said terminal with only a content of the communication data in which the transmitting terminal is judged as said communication terminal permitted to communicate by said second judging means.

8. A communication apparatus according to claim 7, further comprising:

transmitting destination judging means for, when indicated to transmit data from said terminal, judging whether or not a data transmitting destination is said communication terminal permitted to communicate, on the basis of the network address of said communication terminal to which the relevant data is transmitted and the communication regulation information within said communication regulation information storing means; and sending means for sending, onto the transmission line, communication data corresponding to the data indicated to be transmitted only when said transmitting destination judging means judges that said data transmitted terminal is said communication terminal permitted to communicate.

9. A communication terminal used for constituting a local area network, comprising:

communication regulation information storing means for storing communication regulation information defined as information for classifying other communication terminals connected to said local area network into a communication terminal permitted to communicate in accordance with a network address and a terminal not permitted to communicate;

take-in means for taking in communication data addressed to said means itself from the transmission line on the basis of a receiving LAN address contained in the communication data propagating through the transmission line;

judging means for judging, based on a transmitting network address contained in the communication data taken in by said take-in means and the communication regulation information within said communication regulation information storing means, whether or not a terminal of transmitting the communication data is a communication terminal permitted to communicate; and outputting means for outputting, to said terminal, only a content of the communication data transmitted by said terminal judged as the communication terminal permitted to communicate.

10. A communication apparatus, comprising:

communication regulation information storing means for storing communication regulation information defined as information for classifying other communication terminals connected to said local area network into a communication terminal permitted to communicate in accordance with a network address and a terminal not permitted to communicate;

transmitting destination judging means for, when indicated to transmit data by the user, judging whether or not a data transmitting destination is said communication terminal permitted to communicate, on the basis of the network address of said communication terminal to which the relevant data is transmitted and the communication regulation information within said communication regulation information storing means; and sending means for sending, onto the transmission line, communication data corresponding to the data indicated to be transmitted only when said transmitting destination judging means judges that said data transmitted terminal is said communication terminal permitted to communicate.

11. A program recording medium recorded with a program for making a computer including a communication control unit connected to a transmission line of a local area network, function as:

communication regulation information storing means for storing communication regulation information defined as information for classifying other communication terminals connected to said local area network into a communication terminal permitted to communicate and a terminal not permitted to communicate in accordance with a network address;

judging means for judging, based on a transmitting network address contained in the communication data taken in by said communication control unit and the communication regulation information within said communication regulation information storing means, whether or not a communication data transmitting terminal is a communication terminal permitted to communicate; and outputting means for outputting only a content of the communication data in which the transmitting terminal is judged as said communication terminal permitted to communicate by said judging means.

12. A program recording medium recorded with a program for making a computer including a communication control unit connected to a transmission line of a local area network, function as:

communication regulation information storing means for storing communication regulation information defined as information for classifying other communication terminals connected to said local area network into a communication terminal permitted to communicate and a terminal not permitted to communicate in accordance with a network address;

judging means for judging, based on a transmitting network address contained in the communication data taken in by said communication control unit and the communication regulation information within said communication regulation information storing means, whether or not a communication data transmitting terminal is a communication terminal permitted to communicate;

outputting means for outputting only a content of the communication data in which the transmitting terminal is judged as said communication terminal permitted to communicate by said judging means;

transmitting destination judging means for, when indicated to transmit data by a user, judging whether or not a data transmitting destination is said communication terminal permitted to communicate, on the basis of the network address of said communication terminal to which the relevant data is transmitted and the communication regulation information within said communication regulation information storing means; and sending means for sending, onto the transmission line, communication data corresponding to the data indicated to be transmitted by controlling said communication control unit only when said transmitting destination judging means judges that said data transmitted terminal is said communication terminal permitted to communicate.

* * * * *

UNITED STATES PATENT AND TRADEMARK OFFICE
CERTIFICATE OF CORRECTION

PATENT NO. : 6,205,483 B1  
DATED : March 20, 2001  
INVENTOR(S) : Takayuki Nakanishi It is certified that error appears in the above-identified patent and that said Letters Patent is hereby corrected as shown below:

<u>Title page, item [54],</u>
Please correct the Title from NETWORK INTERFACE THAT PREVENTS MAC OR IP ADDRESS SPOOFING OF A MANAGEMENT STATION BY MAKING A MANAGEMENT STATION ADDRESS REGISTER UNCHANGEABLE BY SOFTWARE to COMMUNICATION APPARATUS, COMMUNICATION TERMINAL AND PROGRAM RECORDING MEDIUM.

Signed and Sealed this

Twenty-fifth Day of September, 2001

Attest:

NICHOLAS P. GODICI
*Attesting Officer*  *Acting Director of the United States Patent and Trademark Office*